US011818103B2

(12) United States Patent
Rafferty et al.

(10) Patent No.: US 11,818,103 B2
(45) Date of Patent: Nov. 14, 2023

(54) DIGITAL STATEMENT MUTING AND OBSCURATION

(71) Applicant: Capital One Services, LLC, McLean, VA (US)

(72) Inventors: Galen Rafferty, Mahomet, IL (US); Anh Truong, Champaign, IL (US); Jeremy Edward Goodsitt, Champaign, IL (US); Austin Walters, Savoy, IL (US); Vincent Pham, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 215 days.

(21) Appl. No.: 17/116,968

(22) Filed: Dec. 9, 2020

(65) Prior Publication Data
US 2022/0182362 A1 Jun. 9, 2022

(51) Int. Cl.
*H04L 9/40* (2022.01)
*G06Q 40/02* (2023.01)
*G06F 3/0484* (2022.01)

(52) U.S. Cl.
CPC ........ *H04L 63/0407* (2013.01); *G06Q 40/02* (2013.01); *G06F 3/0484* (2013.01)

(58) Field of Classification Search
None
See application file for complete search history.

(56) References Cited

U.S. PATENT DOCUMENTS

| | | | | |
|---|---|---|---|---|
| 10,528,838 | B1* | 1/2020 | Carter, Jr. | G06Q 20/383 |
| 2007/0030528 | A1* | 2/2007 | Quaeler | G06F 16/33 |
| | | | | 358/448 |
| 2012/0131471 | A1* | 5/2012 | Terlouw | H04W 12/02 |
| | | | | 715/741 |
| 2015/0052035 | A1* | 2/2015 | Calman | G06Q 40/02 |
| | | | | 705/35 |
| 2016/0378999 | A1* | 12/2016 | Panchapakesan | G06F 21/6254 |
| | | | | 726/26 |
| 2017/0374076 | A1* | 12/2017 | Pierson | H04L 63/08 |
| 2018/0232762 | A1* | 8/2018 | Greene | G06Q 30/0255 |

* cited by examiner

*Primary Examiner* — Stella Higgs
(74) *Attorney, Agent, or Firm* — TROUTMAN PEPPER HAMILTON SANDERS LLP; Christopher J. Forstner; John A. Morrissett

(57) ABSTRACT

Systems and methods for selectively obscuring data in a digital statement are disclosed. The systems and methods can relate to multiple user accounts that access a shared account. The systems can include means to determine which account completed a transaction. Device location tracking and hardware characteristics of the devices can be used to determine which account completed the transaction. Information related to transactions that fall outside of expected spend categories can be selectively obscured on the digital statement of the non-transacting account. The information related to the transaction can be selectively viewable by non-transacting account.

12 Claims, 12 Drawing Sheets

FIG. 3A

| Posting Date | Description | Amount | Available Balance |
|---|---|---|---|
| 09/05/2020 | CHECKCARD STARBUCKS WA | -7.57 | 125.27 |
| 09/06/2020 | SHELL GASOLINE MARIETTA GA | -37.22 | 132.84 |
| 09/06/2020 | GROCERY SUPERMARKET PURCHASE SMYRNA GA | -125.33 | 170.06 |
| 09/08/2020 | FOOD DELIVERY SERVICE PURCHASE 12456572 | -17.78 | 295.39 |
| 09/09/2020 | ARAMARK VENDING PURCHASE KENNESAW GA | -1.38 | 313.17 |
| 09/10/2020 | TIFFANY AND CO JEWELRY ATLANTA GA | -1438.25 | 314.55 |

FIG. 3B

| Posting Date | Description | Amount | Available Balance |
|---|---|---|---|
| 09/05/2020 | CHECKCARD STARBUCKS WA | -7.57 | 125.27 |
| 09/06/2020 | SHELL GASOLINE MARIETTA GA | -37.22 | 132.84 |
| 09/06/2020 | GROCERY SUPERMARKET PURCHASE SMYRNA GA | -125.33 | 170.06 |
| 09/08/2020 | FOOD DELIVERY SERVICE PURCHASE 12456572 | -17.78 | 295.39 |
| 09/09/2020 | ARAMARK VENDING PURCHASE KENNESAW GA | -1.38 | 313.17 |
| | | | 314.55 |

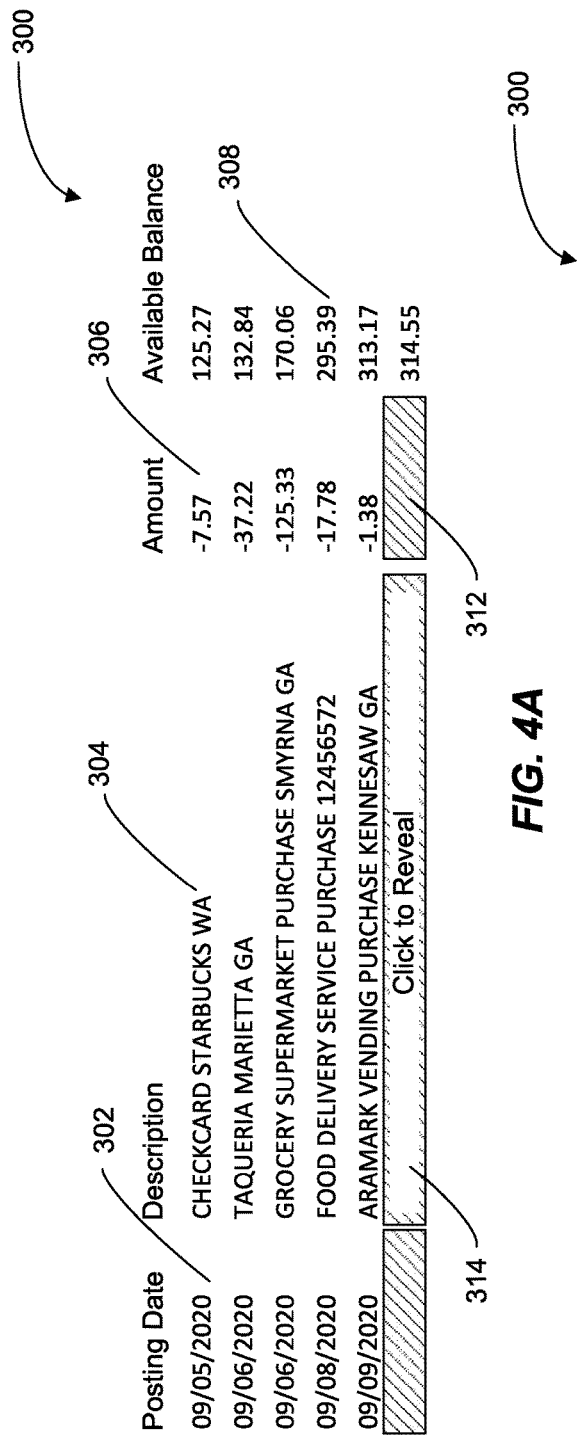
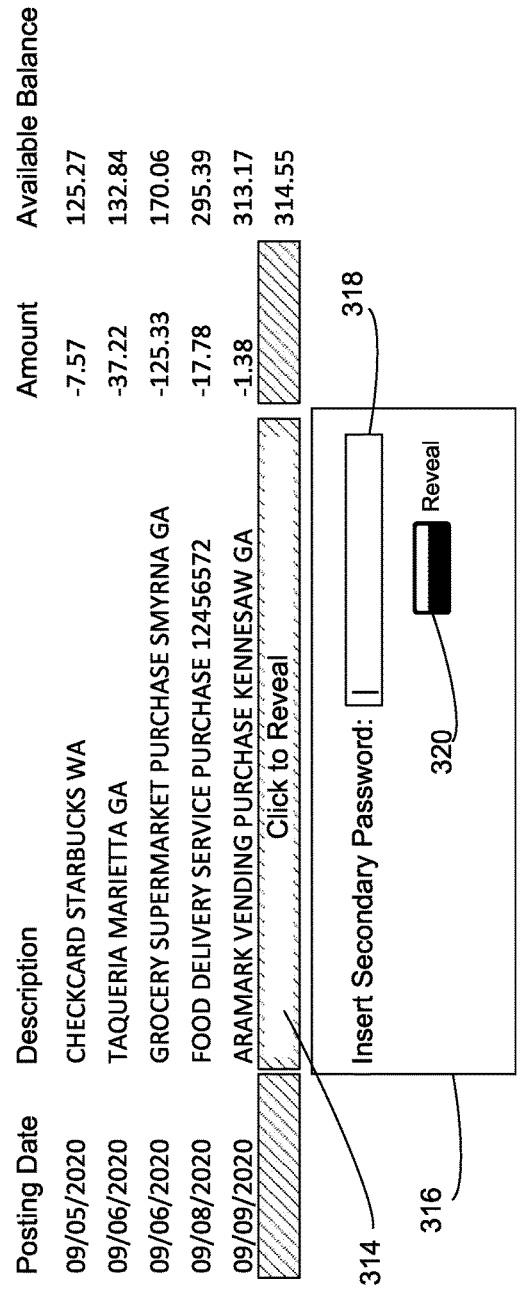
FIG. 4A
FIG. 4B

| Description | Number of Transactions |
|---|---|
| Groceries | 47 |
| Entertainment | 23 |
| Restaurants | 21 |
| Jewelry | 1 |
| Gasoline | 37 |
| Travel | 25 |

*FIG. 6*

DIGITAL STATEMENT MUTING AND OBSCURATION

FIELD

The present disclosure relates generally to systems and methods for selectively obscuring transactions in a digital statement of a shared financial account and, more particularly, to systems and methods for selectively obscuring transactions from view in one user account of the shared financial account while allowing the transactions to be viewed in another user account.

BACKGROUND

It is a common trend in the banking world for two or more people to share a single financial account. For example, two people sharing one checking account can have two separate debit cards or transaction numbers to use that one account and view and balance the budget by reviewing the statement of that one account. This arrangement applies to other types of financial accounts, such as a credit card account where multiple users can review their monthly expenditures to make sure they stay on budget. While this arrangement for multiple users to share a single account provides certain advantages, it also comes with a few disadvantages.

For example, it is ordinarily beneficial for all of the users to have the ability to view the financial statement of the shared account (e.g., for budget balancing and the like). There are certain times, however, that one of the users may wish to obscure purchase details that would ordinarily be viewable by all users of the shared account. For example, if user A purchases a gift for one of the other users, the information related to that gift (e.g., merchant identifier or name, purchase amount, date, etc.) will be readily viewable by all approved users. User A may wish to keep that gift a secret from the other users, however.

To date, there are few options for user A in the hypothetical above to hide or obscure information related to the gift purchase, for a number of valid reasons. First, it is uncommon, if not entirely prohibited, for financial institutions to allow any user to delete or completely remove a financial transaction from a financial statement. This type of process can lead to fraud. Consider, for example, the ability of a financial account holder to completely delete or remove a transaction from a financial statement during underwriting for obtaining a loan. Financial institutions will uniformly object to such a feature, so that the potential borrower is required to be fully candid with the financial lender. Second, not hiding individual transactions leads to transparency. Financial instructions strive to be transparent to their users. If one user is able to delete or completely remove a transaction, one or more of the other users are not able to review their entire financial history. This can be undesirable, since those other users are, after all, customers of the financial institution who deserve at least the ability to review their financial statement.

What is needed, therefore, are improved systems and methods that enable individual users of a shared account to enjoy the benefits of a shared account while having the ability to conveniently and discretely make certain purchases (e.g., for gifts and other target transactions) without raising potential issues with fraud or transparency between financial institutions and their clients.

BRIEF SUMMARY OF THE INVENTION

Examples of the present disclosure relate to digital methods for identifying and obscuring one or more target transactions in a digital financial statement. The systems and methods described herein are necessarily rooted in computer technology as they relate to digital financial statements, graphical user interfaces, and the ability of computing systems to conserve computing power to create, update, and display said digital information. Further, the systems and methods described herein provide security measures unavailable in prior digital statement systems to secure information in a digital statement without leading to fraudulent, or at least unethical, deletion of data from the digital statements in the graphical user interfaces.

The present disclosure provides a method for selectively obscuring transaction information in a graphical user interface (GUI). The method can include receiving historical transaction data for a first user account of a shared financial account. Individual transactions of the historical transaction data can be categorized into a plurality of purchase categories (e.g., groceries, entertainment, travel, etc.). The method can include receiving a transaction notification indicating that a first transaction has been made using the shared account. The shared account can be linked to and accessible by the first user account and a second user account. The method can include determining that the first transaction was completed by the first user account. Several examples of how this determination can be made are provided herein, including location tracking of user devices and reviewing hardware characteristics of the user devices. The method can include comparing the first transaction with the plurality of purchase categories. The method can include determining whether the first transaction falls outside of an expected transaction type for the first user account. The determinization can be based at least on the comparing the first transaction with the plurality of purchase categories. The method can include generating, responsive to determining that the first transaction falls outside of the expected transaction type for the first user account the GUI. The GUI can include a digital statement listing information related to one or more transactions that includes the first transaction. The GUI can selectively obscure at least a portion of information related to the first transaction from view by the second user account. The information related to the first transaction can be selectively viewable by the second user account. This can be completed by providing clickable spoiler text, by requiring a password to remove the spoiler text, etc. The method can include receiving a request from the second user account to view the digital statement. The method can include outputting the GUI with the digital statement including the information related to the first transaction for display on a first user device associated with the second user account. The at least a portion of the information related to the first transaction displayed on the first user device can be obscured on the digital statement responsive to determining that (i) the first transaction was completed by the first user account and (ii) the first transaction falls outside of the expected transaction type for the first user account.

Additional method steps are provided herein. For example, the first and second user accounts can enroll in the transaction obscuring program. Upon enrollment, the users can identify dates in which to trigger the determination of whether the first transaction falls outside of the expected transaction type. These dates can be holidays, birthdays, anniversaries, etc.

The present disclosure also provides a system for increasing security of a digital statement. The system can include one or more processors and memory in communication with the one or more processors and storing instructions that cause the system to perform the process steps to increase the security of the digital statement. The process can include generating the digital statement to include a plurality of transactions for a shared account. The shared account can be linked to and accessible by a first user account and a second user account. The process can include receiving, from a merchant system, a first indication that the first user account completed a first transaction. The process can include updating the digital statement to include the first transaction. The process can include generating, responsive to updating the digital statement, a first graphical user interface (GUI) including the digital statement listing information related to the plurality of transactions including the first transaction. The first GUI can display all information related to the first transaction and can be outputted for display on a device associated with the first user account. The process can include generating, responsive to updating the digital statement, a second GUI including the digital statement listing information related to the plurality of transactions including the first transaction. The second GUI can selectively obscure at least a portion of the information related to the first transaction from view by the second user account. The information related to the first transaction can be selectively viewable by the second user account and can be outputted for display on a device associated with the second user account.

The present disclosure also provides a system for obscuring gift purchases in a digital statement. The system can include one or more processors and memory in communication with the one or more processors and storing instructions that cause the system to perform the process steps to obscure gift purchases. The process can include storing financial information related to a financial account shared by a first user account and one or more other user accounts. The process can include receiving data indicative of a plurality of financial transactions for the first user account and the one or more other user accounts. The process can include generating a digital financial statement including the plurality of financial transactions. The statement can include a plurality of line items, each line item being associated with one transaction of the plurality of financial transactions and including a merchant identifier and a transaction amount. The process can include receiving an indication of a first transaction from a merchant device. The indication of the first transaction can include a first merchant identifier and a first amount. The process can include determining that the first transaction was completed by the first user account. The process can include updating the digital financial statement to include the first transaction, the first merchant identifier, and the first amount, thereby creating an updated digital statement. The process can include receiving, from one of the one or more other user accounts, a request to view the updated digital statement in a graphical user interface (GUI). The process can include determining that the first transaction falls into a first category to be obscured on the updated digital statement. The process can include obscuring at least one of the first merchant identifier or the first amount in response to determining that the first transaction falls into the first category to be obscured, thereby creating an obscured version of the digital statement. The process can include outputting the GUI to include the updated digital statement for display on a first user device associated with the first user account. The process can include outputting, in response to determining that the first transaction falls into the first category to be obscured, the GUI to include the obscured version of the digital statement for display on a second user device associated with the one or more other user accounts.

These and other aspects of the present disclosure are described in the Detailed Description below and the accompanying figures. Other aspects and features of examples of the present disclosure will become apparent to those of ordinary skill in the art upon reviewing the following description of specific, exemplary examples of the present invention in concert with the figures. While features of the present disclosure can be discussed relative to certain examples and figures, all examples of the present disclosure can include one or more of the features discussed herein. Further, while one or more examples can be discussed as having certain advantageous features, one or more of such features can also be used with the various examples of the invention discussed herein. In similar fashion, while exemplary examples can be discussed below as device, system, or method examples, it is to be understood that such exemplary examples can be implemented in various devices, systems, and methods of the present invention.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner In the drawings:

FIGS. 3A-3C depict example digital statements, according to the present disclosure;

FIGS. 4A-4C are example GUIs for systems that enable the user accounts to selectively view obscured transactions, according to the present disclosure;

FIG. 6 is an example categorization system for grouping historical purchase data into purchase categories, according to the present disclosure;

DETAILED DESCRIPTION

Figure 1:
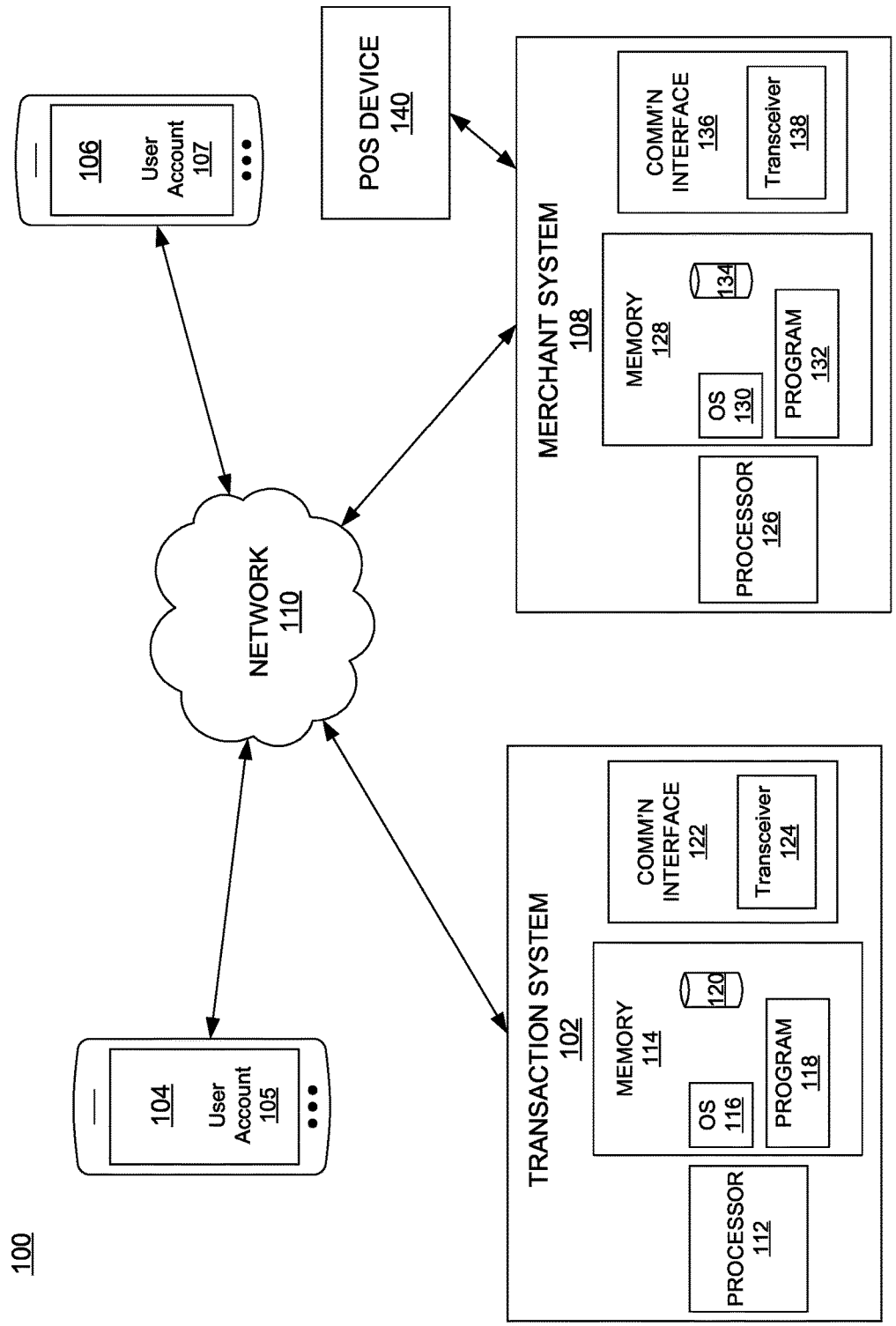
FIG. 1 is a diagram of an example system that can be used to implement one or more examples of the present disclosure.

Examples of the present disclosure include systems and methods for selectively obscuring transactions in a digital statement of a shared financial account and, more particularly, to systems and methods for selectively obscuring transactions from view in one user account of the shared financial account while allowing the transactions to be viewed in another user account. Throughout this disclosure, it can be understood that "obscuring" a piece of data or "data obscuration" can refer to hiding one or more items of data related to a financial transaction. For example, when a consumer makes a purchase, be it with a transaction card, check, or online payment, the information related to that transaction is compiled and added to a digital financial statement. The information related to that transaction can include merchant identifiers (e.g., Merchant Category Codes (MCCs), Merchant Identifier Numbers (MIDs), etc.), a merchant name, a date, a transaction amount, and the like. The systems and methods can obscure one or more those transaction identifiers so as to conceal the identifiable information related to that purchase.

The systems and methods described herein are necessarily rooted in computer technology as they relate to these digital financial statements and, in particular, the ability to generate graphical user interfaces (GUIs) that include transaction information in said digital statements. Systems and methods that offer the ability to obscure certain data provides clear and unmistakable benefits to both the computing architecture of the financial institution and the computing architecture of the user (customer) devices that access the digital statements. Digital financial statements are not static and are continuously changing based on current transaction information. To this end, the digital statements are not cached, meaning the transaction system must continuously retrieve and process the statements for the GUI to display the transaction information. For the user devices, this means that, instead of retrieving the information from the faster static RAM (SRAM) (i.e., as if the financial data was cached), the information is populated by the slower dynamic RAM (DRAM). This means that the transaction system (e.g., bank backend system) can benefit from systems that generate GUIs that display only a portion of the data, and the user devices can benefit from systems that generate and send less data. To this end, the systems and methods described herein provide advantages by relieving some of the processing power from the sending and receiving devices, for example by limiting the amount of data being generated, transmitted, received and displayed.

This disclosure relates to systems and methods that enable users of a shared financial account to selectively obscure certain transactions from view in a digital financial account when viewed by other accounts of the shared financial account. This can be completed manually, for example if account holder A wishes to hide a gift purchase from account holder B, account holder A can manually select to obscure information related to the gift from view by account holder B. In other examples, the systems can learn from historical transaction data associated with account holder B so that the targeted transaction can be obscured automatically, or at least account holder A can be notified that the transaction can be obscured. This digital decision making can be completed by categorizing the historic transactions to determine if the targeted transaction falls outside of an expected purchase.

Reference will now be made in detail to exemplary examples of the disclosed technology, examples of which are illustrated in the accompanying drawings and disclosed herein. Wherever convenient, the same reference numbers will be used throughout the drawings to refer to the same or like parts.

FIG. 1 is a diagram of an example system 100 that can be used to implement one or more examples of the present disclosure. A more detailed explanation of some of the components of the system 100 is provided below. It is beneficial, however, to provide a brief overview to describe the components of the systems and methods for generating and accessing the digital statements described herein. The system 100 can include a transaction system 102. The transaction system 102 can be affiliated with a financial institution that performs the financial account processes described herein. For example, the transaction system 102 can receive and process transaction requests, store and compile historical transaction data for user accounts, maintain shared accounts, maintain user accounts for a plurality of user accounts that can access the user accounts, compile the digital transactions, etc.

The system 100 can include a first user device 104. The first user device 104 can be associated with a first user account 105 of a plurality of user accounts associated with the shared user account. The system 100 can also include a second user device 106. The second user device 106 can be associated with a second user account 107 of a plurality of user accounts associated with the shared user account. When reference is made herein to a "first" and "second" device or a "first" and "second" account, it will be understood that these descriptors are to differentiate one component from another, and they are not meant to define that one component comes before or after another. The first user account 105 and second user account 107 can be individual financial accounts held by different people. For example, a husband and wife may have separate financial accounts (e.g., the husband operating the first user account 105 and the wife operating the second user account 107). Although both user accounts 105, 107 may be separate at the financial institution (i.e., transaction system 102), they may both have access to a single shared account, for example a checking/debit account, credit card account, savings account, and the like.

The system 100 can include a merchant system 108. The merchant system 108 can be an entity that provides goods or services that can be purchased by the shared account. The merchant system 108 can include a merchant device (e.g., a point of sale device 140) for receiving an indication of a transaction request from the first user account 105 or the second user account 107. The information related to the transaction request can be transmitted to the transaction system 102 to process the payment and update the digital statement.

The transaction system 102, first user device 104, second user device 106, and merchant system 108 can communicate via a wired or wireless network 110. The network 110 can, therefore, facilitate the transactions and statement viewing described herein. The wired networks can be an Ethernet network and the wireless networks can be cellular or WiFi™ networks, for example. In some examples, network 110 can connect terminals, services, and user devices using direct connections such as radio-frequency identification (RFID), near-field communication (NFC), Bluetooth™, low-energy Bluetooth™ (BLE), WiFi™, ZigBee™ ambient backscatter communications (ABC) protocols, USB, WAN, or LAN. Because the information transmitted can be personal or confidential (e.g., it can include passwords), the connections can also be encrypted or otherwise secured. It is contemplated that the network 110 is more than one networks or more than one types of networks. For example, it is contemplated that the first user device 104 and second user device 106 can communicate with each other over one type of network (e.g., Bluetooth™, etc.), and the transaction system 102, first user device 104, second user device 106, and merchant system 108 can communicate over a different type of network (e.g., cellular network, WiFi™ network, etc.).

Figure 2:
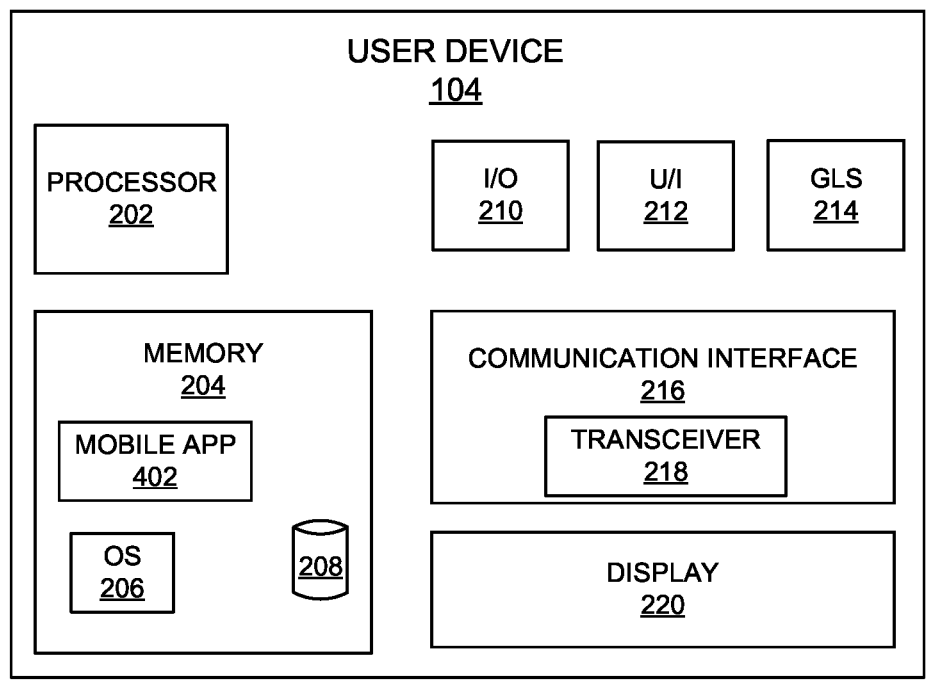
FIG. 2 is a component diagram of an example user device, according to the present disclosure.

FIG. 2 is a component diagram of an example first user device 104 that can be used to access the shared financial account and view the digital statement from the point of view of the first user account 105. Although only the first user device 104 is shown in FIG. 2, the second user device 106 can be substantially similar to the first user device 104. The first user device 104 can be a mobile computing device (e.g., a smart phone, tablet computer, smart wearable (e.g., a smart watch), portable laptop computer, voice command device, wearable augmented reality device, or other mobile computing device) or a stationary device (e.g., desktop computer). The first user device 104 can include a processor 202 and a memory 204, operating system ("OS") 206, one or more programs (e.g., application 402 described below), and/or data storage 208. The first user device 104 can also include a communication interface 216 that includes a transceiver 218. The communication interface 216 and/or transceiver can be used to transmit and/or receive the notifications described throughout this disclosure.

The first user device 104 can also include one or more input/output ("I/O") devices 210 that can include one or more interfaces for receiving signals or input from devices and providing signals or output to one or more devices that allow data to be received and/or transmitted by the first user device 104. For example, the first user device 104 can include interface components, which can provide interfaces to one or more input devices, such as one or more keyboards, mouse devices, touch screens, track pads, trackballs, scroll wheels, digital cameras, microphones, sensors, and the like, that enable the first user device 104 to receive data from one or more users.

The first user device 104 can also include a user interface ("U/I") device 212 for receiving user input data, such as data representative of a click, a scroll, a tap, a press, or typing on an input device that can detect tactile inputs. According to some examples, U/I device 212 can include some or all of the components described with respect to I/O device 210 above. The U/I device 212 can be defined as the "input" of the first user device 104. The first user device 104 can also include a geographic location sensor ("GLS") 214 for determining the geographic location of the first user device 104.

The first user device 104 can include a display 220. The display 220 can provide visual representation of the applications (e.g., application 402) and/or GUIs associated with those applications and GUIs described herein. The display 220 can also be a U/I device 212 in the case that the first user device 104 has touchscreen capabilities. In other words, in some examples the display 220 can be the "input" of the first user device 104.

Figure 3C:
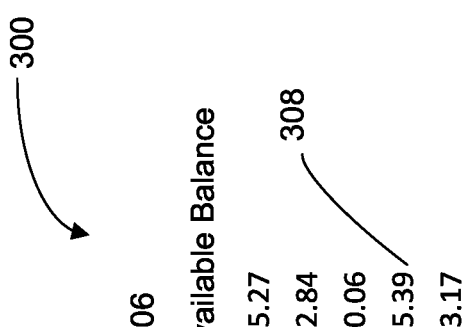

FIGS. 3A-3C depict example digital statements 300, according to the present disclosure. The representations of digital statements 300 in these figures are merely illustrative and not limiting on how a GUI depicting financial transaction information can be presented. The representations, however, nonetheless provide examples on how the digital statements 300 can be muted in part to obscure certain transactions. The digital statements 300 can be a part of a GUI generated by the transaction system 102 above for display on one or both of the first user device 104 or the second user device 106 or any other user device of a financial account associated with the shared account.

In FIG. 3A, the digital statement 300 includes a plurality of transactions 301 that can be displayed on the digital statement 300. The digital statement 300 can include a date field 302 to indicate the posting date (as shown) or the actual transaction date of any particular transaction 301. The digital statement 300 can include a description field 304 that can identify the merchant that processed the transaction 301. The description field 304 can indicate the merchant name, a merchant identifier (e.g., MCC, MID, etc.), merchant location, and the like. The digital statement 300 can include an amount field 306 to indicate the total for the transaction 301, and the digital statement 300 can include an available balance field 308 to indicate the balance in the shared account after the transaction 301.

As can be seen in FIG. 3A, the individual transaction 301 can be associated with particular categories, for example food/grocery, gasoline/travel, and jewelry are all represented in the example digital statement 300. Of these, it may be that the jewelry purchase is the target transaction 310 (otherwise differentiated as the "first transaction" throughout this disclosure) that one of the account holders may wish to hide from one or more of the other account holders of the shared account. FIG. 3B provides an example digital statement 300 wherein the target transaction 310 (e.g., the jewelry purchase in this example) is hidden behind a muting bar 312 that obscures some or all of the data related to the target transaction 310. The muting bar 312 can obscure one or more fields of the target transaction 310. The example shown in FIG. 3A conceals the date field 302, the description field 304, and the amount field 306. However, it may be that one or more of these fields (or portions of data related to the transaction) are not obscured, e.g., the date field 302 and/or the amount field 306 may not be obscured because those fields are not considered sensitive data, for example. This example is shown in FIG. 3C. Alternatively to providing a muting bar 312, the obscured fields may be left blank (i.e., no text is provided) such that the information related to the target transaction 310 is not discernable.

As can be seen, it may be that the available balance field 308 is not obscured from view in any user account of the shared financial account. For example, even if one of the users wishes to hide one of the purchases, it may be valuable to indicate to all users of the shared account how much money remains in the account. As described above, one aspect of shared accounts is the ability to provide transparency—all users are able to review their finances, balance their budgets, and make decisions on the same. To this end, it may provide value to all users to reveal at least the balance in the shared account, though it is contemplated that this field can also be obscured.

As described above, the ability to mute certain fields in the digital statement can provide advantages to the computing systems that generate the digital statement 300 (e.g., the transaction system 102) or the computing systems that review the digital statements 300 (e.g., the first user device 104 and/or second user device 106). This is because less data has to be generated in the GUI that provides the digital statement 300, meaning fewer resources are required to populate and display the digital statement 300.

Referring again to FIGS. 3A and 3B, these two representative digital statements 300 can be the GUIs that are generated for different user accounts (e.g., first user account 105 and second user account 107). This is because the systems described herein can selectively obscure data on one GUI while providing all data to other GUIs. Using an example, it may be that the first user account 105 makes the TIFFANY AND CO JEWELRY purchase, and the user of the first user account 105 wishes to hide this potential gift from a second user of the second user account 107. To this end, the GUI generated to display the digital statement 300 on the first user device 104 for the first user account 105 can display the image shown in FIG. 3A, while the GUI generated to display the digital statement 300 on the second user device 106 for the second user account 107 can display the image shown in FIG. 3B. Alternatively, once muted, the GUI shown in FIG. 3B can be displayed for all user accounts associated with the shared account.

Figure 4C:
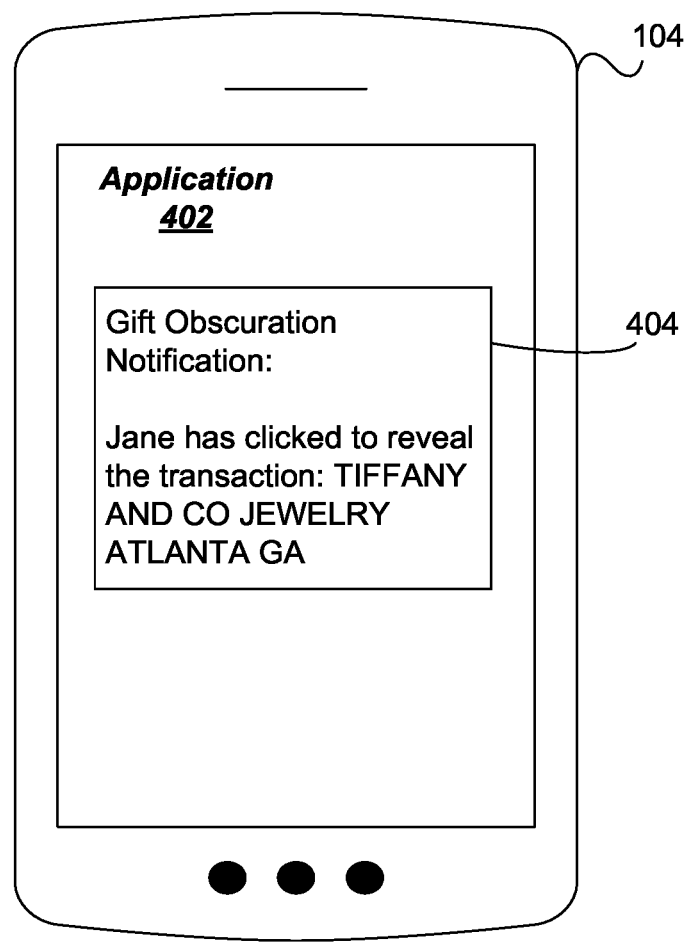

FIGS. 4A-4C are example GUIs for systems that enable the user accounts to selectively view obscured transactions, according to the present disclosure. As described throughout this disclosure, the systems and methods provided herein enable each user account of the shared financial account to have access to all financial data, if desired. FIGS. 4A and 4B depict GUIs that enable hidden transactions in a digital statement 300 to be selectively viewable by the user account to which it is hidden. As shown in FIG. 4A, the GUI can present spoiler text 314 on the muting bar 312 indicating to the user that the target transaction 310 is viewable, but another user may wish for it to be hidden. This spoiler text 314 can alert the viewer of the digital statement 300 that a purchase was made, but that clicking to reveal the information related to the target transaction 310 may reveal a gift or other sensitive transaction. Once the spoiler text 314 is clicked, the user can view the transaction information.

FIG. 4B depicts an interface that requires secondary authorization to view the target transaction 310 if the muting bar 312 is present. Once the spoiler text 314 is clicked, a password notification 316 can be generated, asking the viewer to insert a password into a password field 318 in order to view the muted transaction. The password can be the same password the user account uses to access the digital statement 300, or it can be a different, secondary password or personal identification number (PIN) that is used to reveal the concealed transaction. Once the password is entered into the password field 318, the transaction information can be revealed, for example by selecting a reveal radio button 320. The password field 318 can be implemented so that a second user account 107 (i.e., the concealed account) does not inadvertently view the concealed target transaction 310.

FIG. 4C depicts an example application 402 that can be generated for a user device (e.g., first user device 104, as shown, or any other user device associated with the shared financial account). In the case that the first user account 105 is hiding the target transaction 310, a notification 404 can be generated by the transaction system 102 and transmitted to the first user device 104 for display in the application 402. The application 402 can generate for display on the first user device 104 the notification 404 indicating that a second user account 107 wishes to view the information related to the target transaction 310.

Figure 5A:
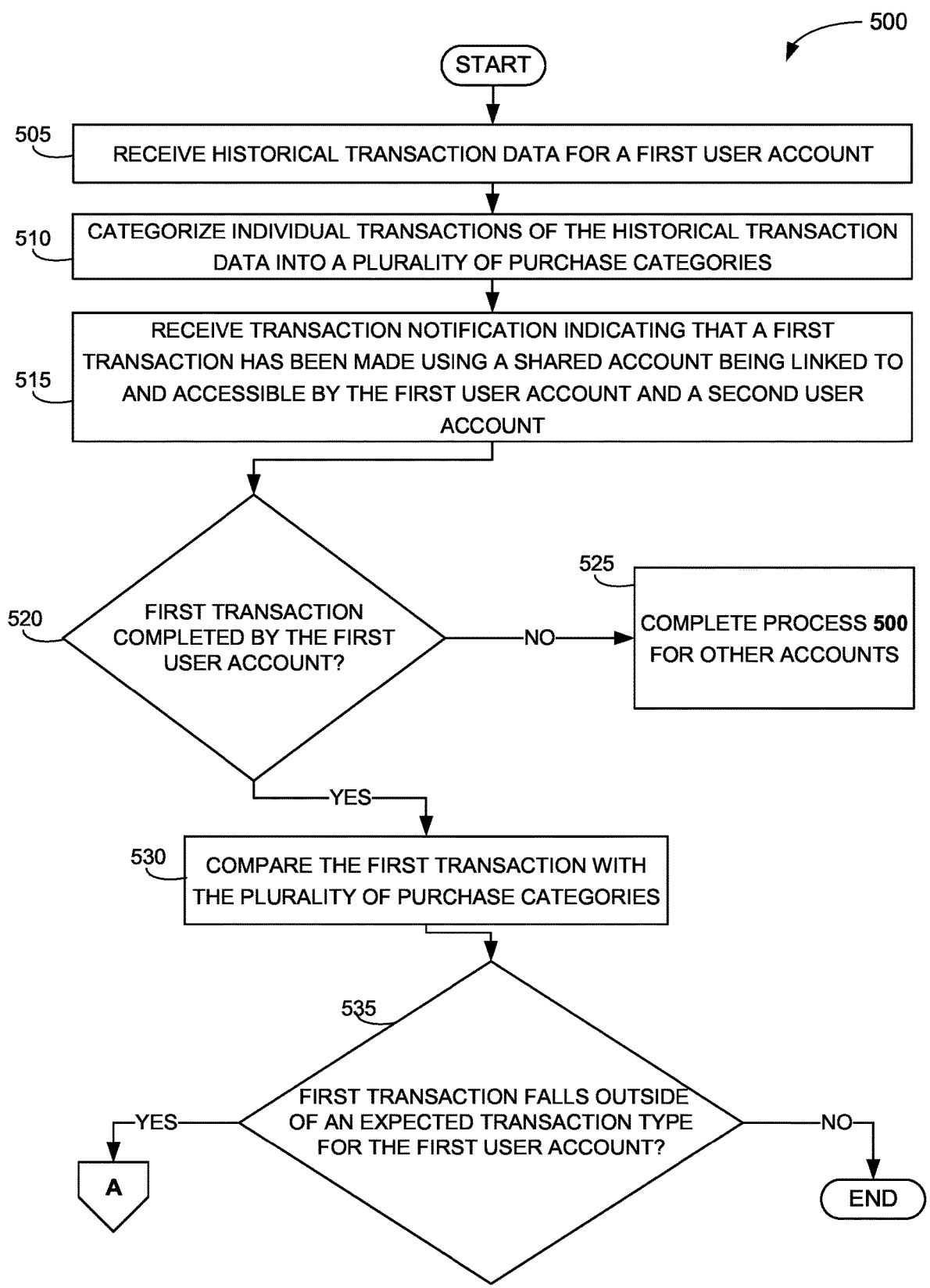
FIGS. 5A and 5B are flowcharts for an example method for selectively obscuring transaction information in a GUI, according to the present disclosure.
Figure 5B:
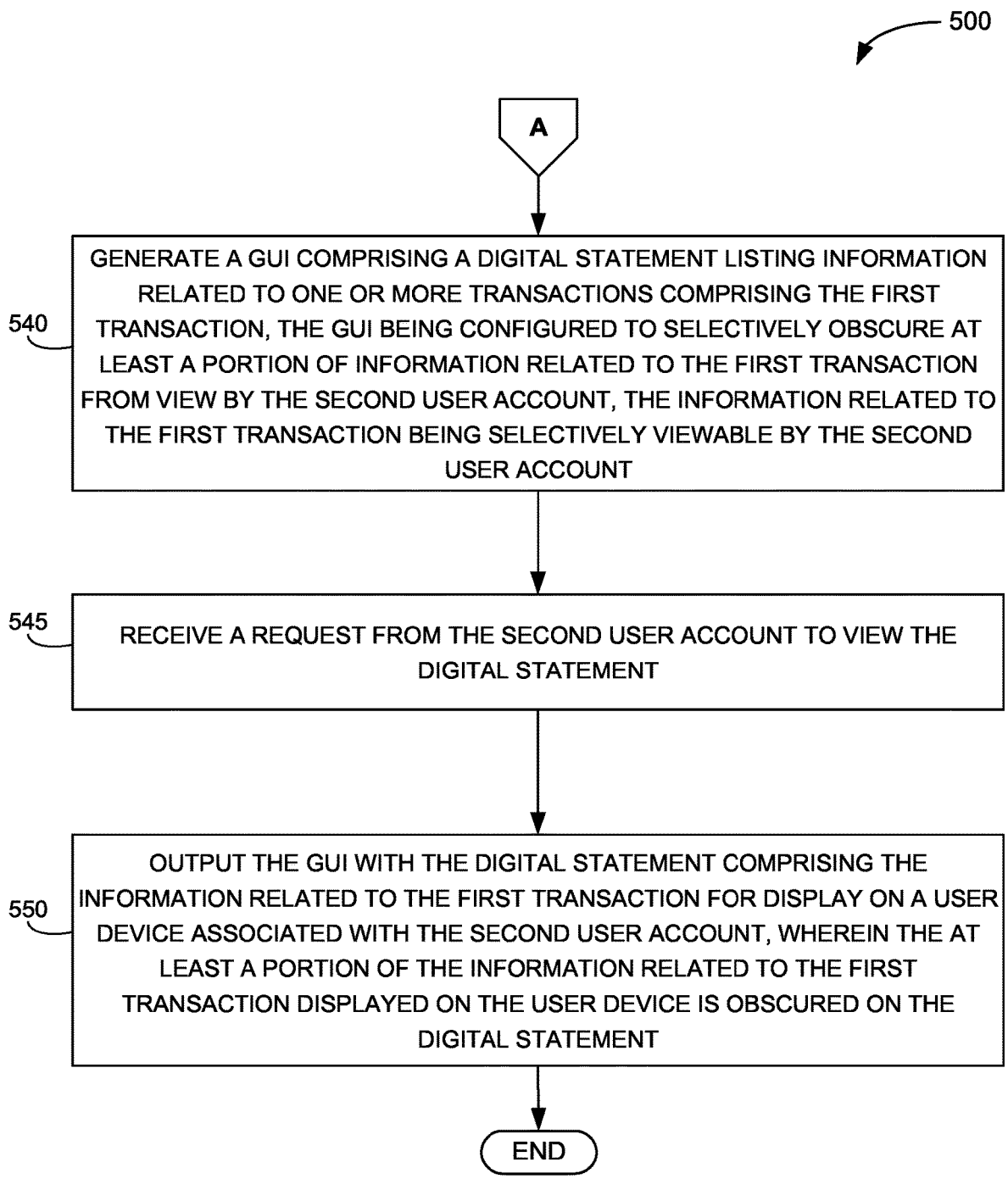

FIGS. 5A and 5B are flowcharts for an example method 500 for selectively obscuring transaction information in a GUI, according to the present disclosure. Method 500 can be performed in whole or in part by the components of the transaction system 102 described above. Method 500 can begin at block 505, which includes receiving, for example at a processor 112 associated with the transaction system 102, historical transaction data for a first user account (e.g., first user account 105). The historical transaction data can include a plurality of prior purchases made using a shared account by the first user account. At block 510, method 500 can include categorizing individual transactions of the historical transaction data into a plurality of purchase categories. An example of this categorizing step is shown in FIG. 6. Summarily, these prior purchases in the historical data can be associated with different types of purchases, i.e., travel, food, grocery, entertainment, jewelry, etc.

At block 515, method 500 can include receiving a transaction notification indicating that a first transaction has been made using a shared account being linked to and accessible by the first user account and a second user account (e.g., second user account 107). The transaction notification can be received at the transaction system 102 from a merchant system 108. For example, one of the user accounts of the shared account can select to make a transaction at a merchant device (e.g., a point of sale device 140), and a notification of this first transaction can be transmitted to the transaction system 102, and the notification can include the data associated with that transaction.

At block 520, method 500 can include determining, for example by a processor 112, that the first transaction was completed by the first user account. This determination can be completed in a number of ways. As a first example, the determination that a user of the first user account completed the first transaction can be based upon location data associated with a user device (e.g., a first user device 104 associated with the first user account) and the merchant (e.g., merchant system 108). For example, when the first transaction is made, that transaction can include a time stamp of the purchase request. The transaction system 102 can ping all user devices associated with the shared account to determine where the user device(s) were located at the time of that time stamp. This can be completed, for example, by using location services of the one or more user devices. Using the first user device 104 as an example, the device can include a GLS 214 for determining the geographic location of the first user device 104. Periodic location information can be stored in the device, for example in memory (e.g., memory 204) of the first user device 104. The application 402 operating on the first user device 104 can access this stored location information to determine where the first user device 104 was located at the time of the time stamp. The transaction system 102 can then compare the location information from the first user device 104 with location information associated the merchant to determine that the first user device with within a predetermined distance, e.g., ½ mile, of a known merchant location at the time of the purchase. If so, the transaction system 102 can conclude that the first user account.

Alternatively or in addition, the determination that a user of the first user account completed the first transaction can be based upon information related to the user device associated with the first user account (e.g., a first user device 104 in FIG. 1). Computing devices, such as smart phones, tablets, smart watches, and the like, include unique hardware identifiers and or a unique device fingerprint that is associated with the computing device. Hardware identifiers can include a serial number, electronic identification code, etc. that is specific to that device. Device fingerprints indicate specific information related to the device, for example, operating system version, Internet Protocol (IP) address, browser version, application version, and the like. These pieces of data can be used to identify which user device, and therefore which user account, completed the first transaction. For example, if the transaction is made on an internet website or e-commerce application, the information related to the transacting device can be transmitted along with the transaction request. Using the device fingerprint and/or hardware identifiers, the transaction system 102 can determine whether the first user account (or its registered device) completed the first transaction. The process for location tracking above and the process for device characteristic tracking both assume the transaction system 102 is aware of these characteristics, which may assume an enrollment step. Examples of this enrollment are described in greater detail below.

Alternatively or additionally, each user account of the shared financial account can have different card numbers associated with the same shared account. For example, the 16-digit code on each card may be different across all user accounts, but the cards all draw on the same account. In this scenario, the transaction made using any of the cards can be traced to the user who made the purchase by tracing the card number that was used.

If the first transaction was not completed by the first user account, method 500 can be completed for any of the other accounts of the shared account, as shown in block 525. If it is determined that the first user account completed the first transaction, method 500 can proceed to block 530, which includes comparing the first transaction with the plurality of purchase categories. An example of this comparison is described in greater detail with reference to FIG. 6. Summarily, the transaction system 102 can compare the transaction information (e.g., transaction amount, merchant name, merchant identifier, time, etc.) with those transaction characteristics. The purchase categories can be assigned by the transaction system 102 based on predefined categories. For example, the transaction system 102 can include a certain number of predefined "buckets" that can be used to categorize all types of purchases, including for example, "food," "groceries," "travel," "entertainment," "electronics," "clothing," and the like. Each transaction that is completed by the shared financial account can be placed into one of the transaction system 102 predefined categories. The categories can also be created by the users of the account (i.e., by the first user account 105, the second user account 107, or any other individual account of the shared account). In these cases, the user can define one or more categories that they prefer to characterize their purchases. For example, if the user identifies "clothing" and "travel," the user can manually indicate what prior purchases should fall into those two categories. The transaction system 102 can then analyze the characteristics (e.g., merchant identifiers, merchant names, etc.) of the transactions that the user placed into "clothing" and "travel," and subsequent similar transactions can be routed into the appropriate user-defined purchase categories.

At block 535, method 500 includes determining whether the first transaction falls outside of an expected transaction type for the first user account based at least on the comparing the first transaction with the plurality of purchase categories. This determination step can review the purchase categories and the information related to the first transaction to determine if the characteristics of the first transaction fall into a purchase category that is typical for the first user account. This may be completed, for example, by determining if similar purchases have taken place over a predetermined number of times over a predetermined time period. If the first transaction does not fall outside of an expected transaction type, method 500 can end.

If the first transaction does fall outside of an expected transaction type, method 500 continue to block 540 in FIG. 5B. At block 540, method 500 includes generating a GUI including a digital statement (e.g., digital statement 300) listing information related to one or more transactions including the first transaction. The GUI can selectively obscure at least a portion of information related to the first transaction from view by the second user account. An example of a digital statement 300 that obscures at least a portion of information related to the first transaction is shown in FIGS. 3B-4B. The information related to the first transaction can be selectively viewable by the second user account. An example of a GUI that is selectively viewable by the second user account is provided, for example, in FIGS. 4A and 4B.

At block 545, method 500 includes receiving a request from the second user account to view the digital statement. This request can be completed, for example, by a user associated with the second user account clicking on spoiler text (e.g., spoiler text 314 in FIG. 4A), by inputting a password (e.g., within the password field 318 in FIG. 4B) to reveal the transaction information, and/or the like.

At block 550, method 500 includes outputting the GUI with the digital statement including the information related to the first transaction for display on a user device associated with the second user account (e.g., second user device 106 in FIG. 1). The at least a portion of the information related to the first transaction displayed on the user device can be obscured on the digital statement responsive to determining that (i) the first transaction was completed by the first user account and (ii) the first transaction falls outside of the expected transaction type for the first user account.

Method 500 can end after block 550. In other examples, additional steps can be performed according to the examples described herein or other examples. In some systems, method 500 can include a step of sending a notification to the first user account (e.g., via the first user device 104 and application 402) so the user can determine whether she wishes to obscure the first transaction.

As described above, some systems can include an enrollment step for enrolling the user accounts of the shared account into a transaction obscuring program to receive the benefits of the systems, methods, and processes described herein. Method 500 can include receiving a request to enroll the first user account of the shared account in a transaction obscuring program; and receiving a request to enroll the second user account of the shared account in the transaction obscuring program. These enrollment steps can assist the transaction system 102 to perform several of the steps described herein. For example, the enrollment into the transaction obscuring program can enable the transaction system 102 to receive permission to track location data for determining which account completed the first transaction. Additionally, the enrollment into the transaction obscuring program can enable the transaction system 102 to receive the hardware characteristics (e.g., identifiers or fingerprints) so as to determine which device completed the first transaction.

In addition, the enrollment into the transaction obscuring program can enable the transaction system 102 to gather more information about individual user preferences for automatically obscuring (or suggesting the obscuration of) the first transaction. During the enrollment process, the transaction system 102 can receive a list of dates in which to trigger the determination of whether the first transaction falls outside of the expected transaction type. The list of dates can be associated with predetermined holidays or events identified by the first user account. To illustrate using an example, during enrollment (or anytime thereafter) a user associated with the first user account can input dates like anniversaries, birthdays, or holidays in which to trigger the determination of whether the first transaction falls outside of the expected transaction type. If the first transaction was made, for example, within a predetermined threshold time (e.g., one month, two months, etc.) of one of those dates, the transaction system 102 can complete the steps of suggesting hiding our automatically hiding information related to the first transaction. The rest of the time throughout the year, the transaction obscuring program may be inactive. In some examples, the information related to the first transaction can be obscured in the digital statement up until the day of or the day after the triggering date. Using FIGS. 3A and 3B to illustrate, if the TIFFANY AND CO JEWELRY purchase took place within one month of an anniversary, the purchase can be obscured (i.e., FIG. 3B). The day after the anniversary, the purchase can be automatically revealed in all digital statements, without requiring a user to click to reveal the purchase information.

FIG. 6 is an example categorization system 575 for grouping historical purchase data into purchase categories 576, according to the present disclosure. As stated above, one aspect of the present systems and methods is the ability to automatically categorize whether a transaction should be concealed from other user accounts. When a user makes a purchase, the transaction system can analyze the characteristics of that purchase to determine what type of purchase was made. This can be completed by using characteristics of the merchant to which the payment is made, including merchant name, merchant identifier (e.g., MCC, MID, etc.), merchant location, and the like. The transaction information can be compiled over a predetermined period of time (e.g., over the preceding month, over the preceding two months, etc.), or over a transaction period (e.g., year-to-date, month-to-date, etc.).

Once the historical transaction data is categorized, and the number of transactions 578 for each category is quantified, the transaction system can determine whether the first transaction falls outside of an expected transaction type for the first user account. For example, if the first transaction (e.g., target transaction 310) is the only purchase within a category, this can be categorized as falling outside of an expected transaction type for the first user account. In FIG. 6, the "jewelry" category includes only a single purchase 580, so the transaction system 102 can categorize this as an unexpected transaction. A certain threshold can also be in place, for example the transaction system 102 can categorize the first transaction as falling outside of expected transaction types if fewer than five, or any other number, transactions are in that category.

Figure 7:
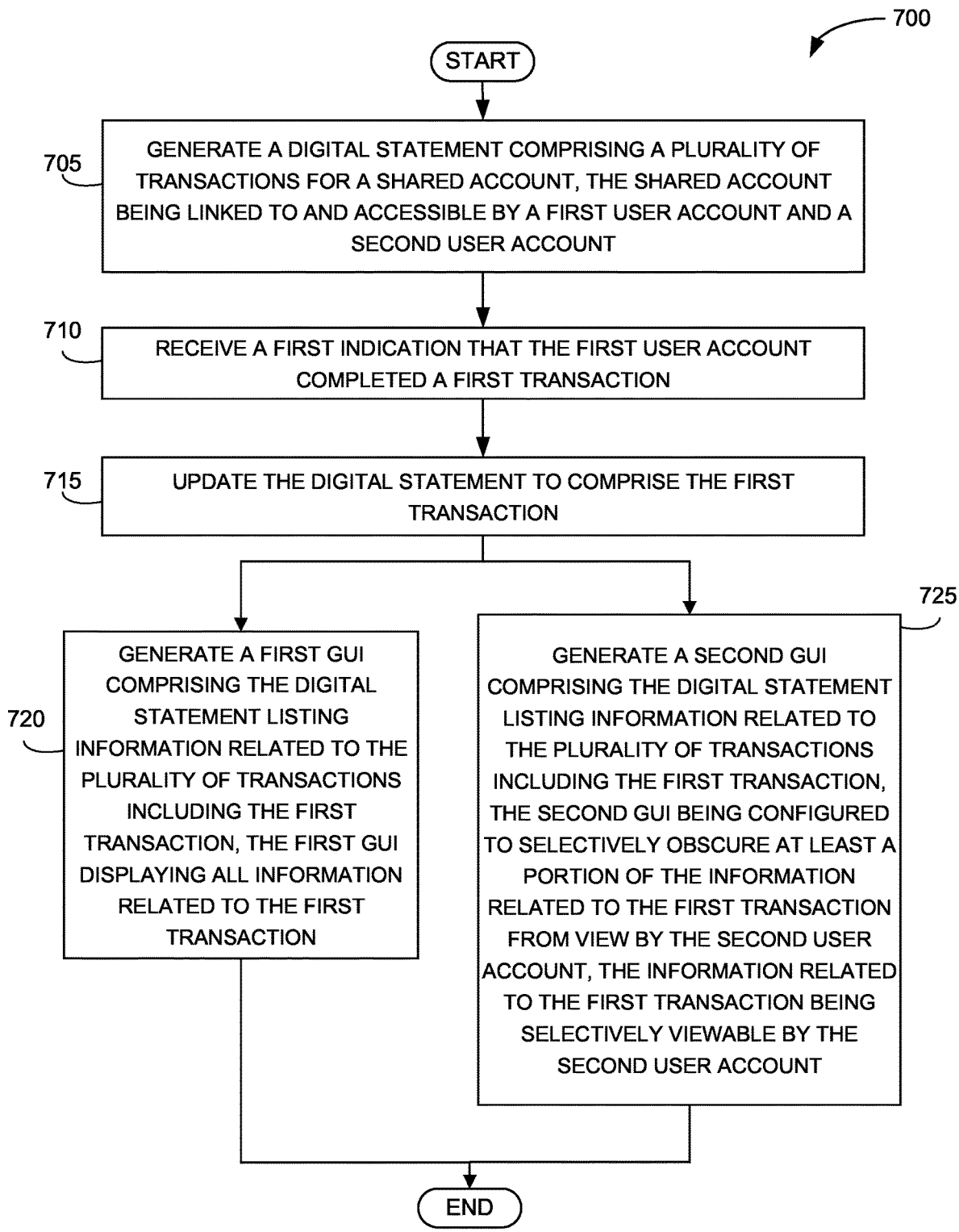
FIG. 7 is a flowchart for an example process for increasing security of a digital statement, according to the present disclosure.

FIG. 7 is a flowchart for an example process 700 for increasing security of a digital statement, according to the present disclosure. Process 700 can be performed in whole or in part by the components of the transaction system 102, for example a processor 112, memory 114, and instructions (e.g., OS 116 and program 118) described below. Process 700 can begin at block 705, which includes generating a digital statement (e.g., digital statement 300) including a plurality of transactions (e.g., transactions 301) for a shared account. The shared account can be linked to and accessible by a first user account (e.g., first user account 105) and a second user account (e.g., second user account 107).

At block 710, process 700 can include receiving, from a merchant system (e.g., merchant system 108), a first indication that the first user account completed a first transaction. The determination that the first user account completed the first transaction can be performed in a manner similar to the process described in block 520 of FIG. 5A. At block 715, process 700 can include updating the digital statement to include the first transaction.

At block 720, process 700 can include generating, responsive to updating the digital statement, a first graphical user interface (GUI) including the digital statement listing information related to the plurality of transactions including the first transaction. The first GUI can display all information related to the first transaction, like shown in FIG. 3A above. The first GUI can be sent to the first user account (e.g., first user device 104), meaning the first GUI can be generated to show all information related to the first transaction since the first user account completed the first transaction.

At block 725, process 700 can include generating, responsive to updating the digital statement, a second GUI including the digital statement listing information related to the plurality of transactions including the first transaction. The second GUI can selectively obscure at least a portion of the information related to the first transaction from view by the second user account, like shown in FIGS. 3B-4B above. The information related to the first transaction can be selectively viewable by the second user account, for example as shown in FIGS. 4A and 4B.

Process 700 can end after block 725. In other examples, additional steps can be performed according to the examples described herein or other examples. For example, process 700 can include receiving a second indication that the second user account wishes to view the information related to the first transaction; and revealing, responsive to receiving the second indication, the information related to the first transaction in the second GUI such that the information is viewable by the second user account. Additional steps can be completed similar to the steps described above with reference to method 500 in FIGS. 5A and 5B.

Figure 8A:
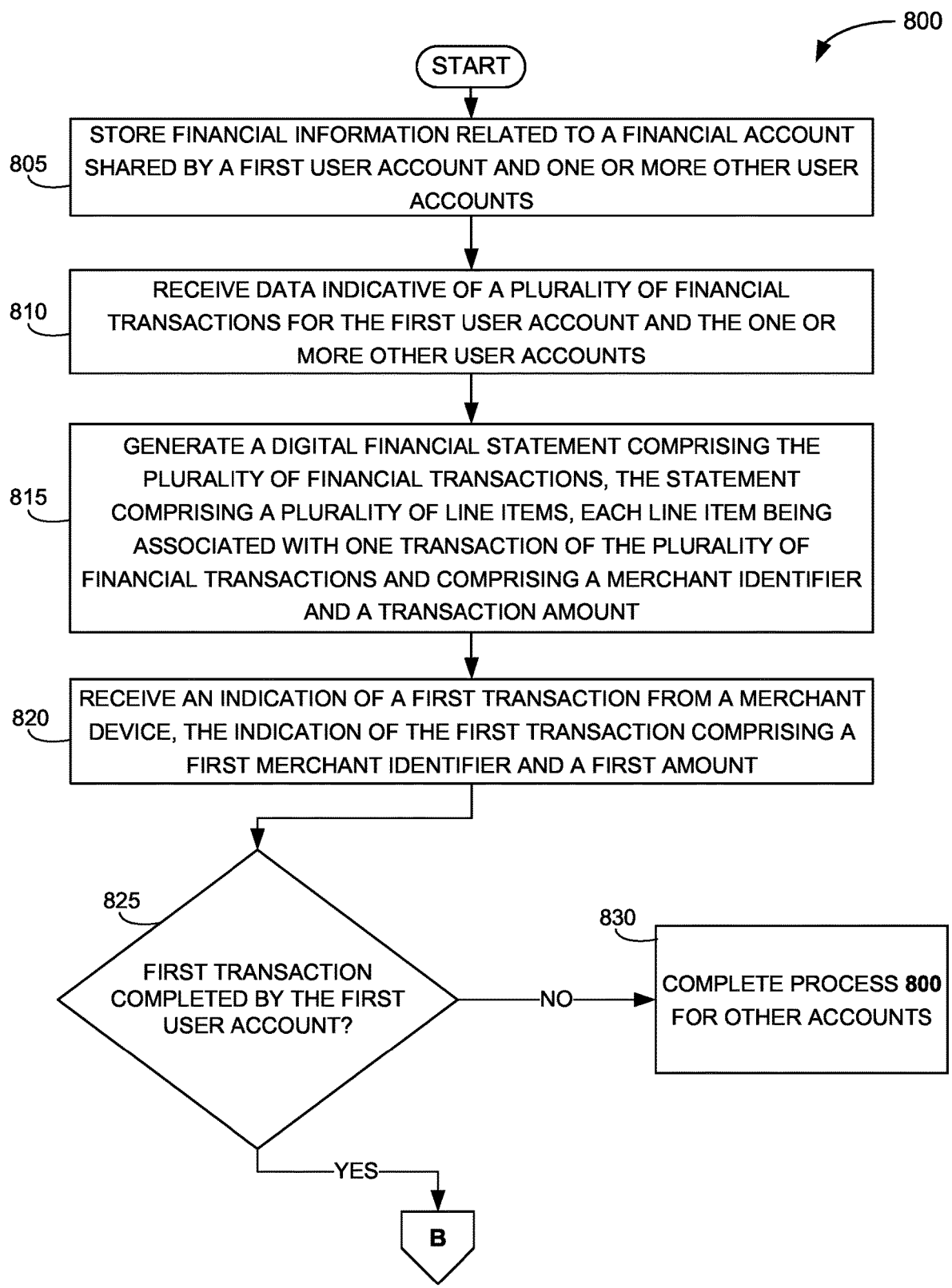
FIGS. 8A and 8B are flowcharts for an example process for obscuring gift purchases in a digital statement, according to the present disclosure.
Figure 8B:
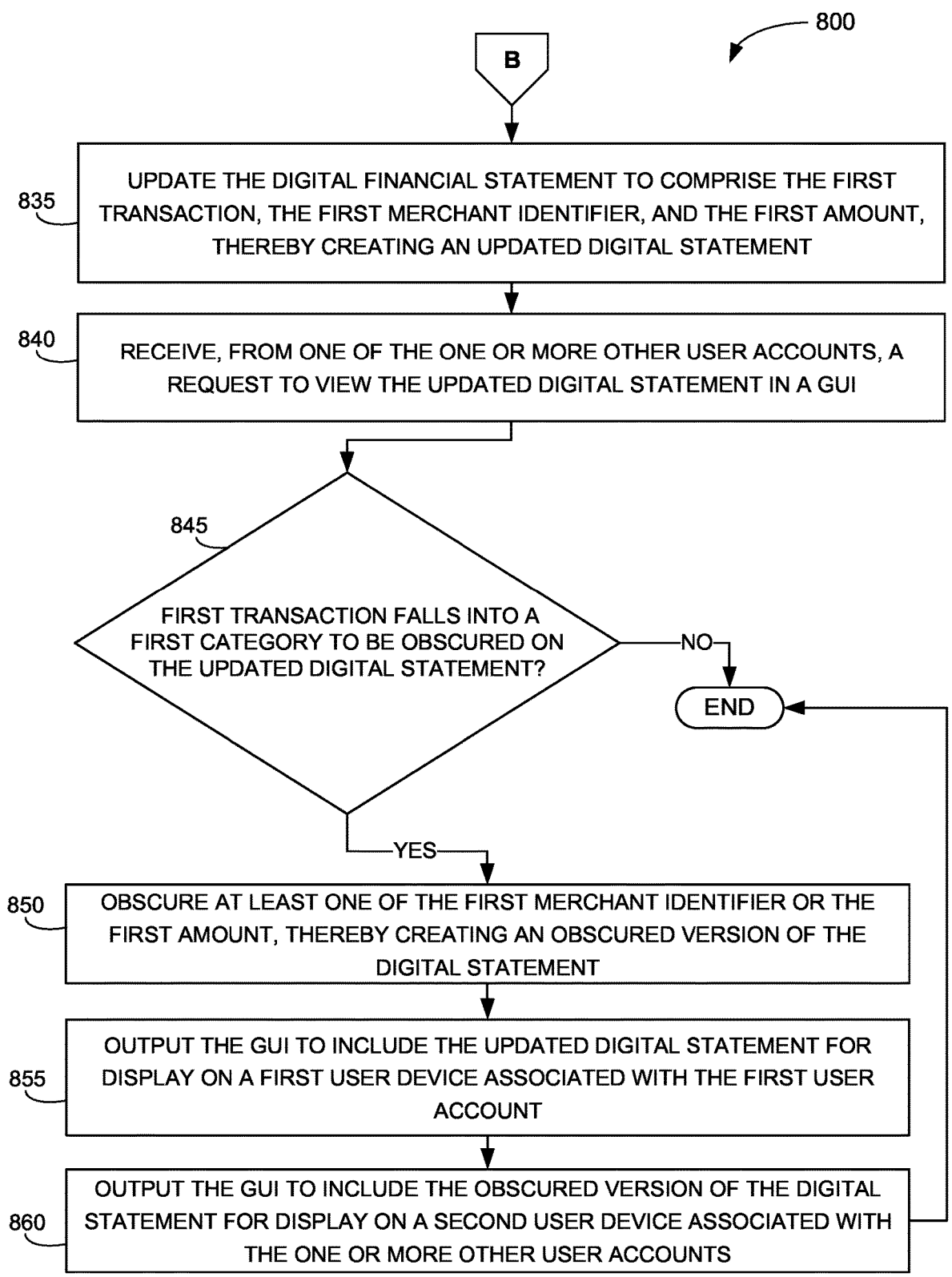

FIGS. 8A and 8B are flowcharts for an example process 800 for obscuring gift purchases in a digital statement, according to the present disclosure. Process 800 can be performed in whole or in part by the components of the transaction system 102, for example the processor 112, memory 114, and instructions (e.g., OS 116 and program 118) described above. Process 800 can begin at block 805, which includes storing, for example in a database 120 of the transaction system 102, data financial information related to a financial account shared by a first user account and one or more other user accounts (e.g., second user account 107 or any account linked to the shared financial account).

At block 810, process 800 can include receiving data indicative of a plurality of financial transactions (e.g., historical transaction data) for the first user account and the one or more other user accounts. At block 815, process 800 can include generating a digital financial statement (e.g., digital statement 300) including the plurality of financial transactions. The statement can include a plurality of line items (e.g., transactions 301), and each line item can be associated with one transaction of the plurality of financial transactions. Each line item can include a merchant identifier and a transaction amount. At block 820, process 800 can include receiving an indication of a first transaction from a merchant device (e.g., point of sale device 140). The indication of the first transaction can include a first merchant identifier and a first amount.

At block 825, process 800 can include determining that the first transaction was completed by the first user account. This determination can be performed in a manner similar to the process described in block 520 of FIG. 5A. If the first transaction was not completed by the first user account, process 800 can be completed for any of the one or more other user accounts, as shown in block 830. If it is determined that the first user account completed the first transaction, process 800 can proceed to block 835 in FIG. 8B.

At block 835, process 800 can include updating the digital financial statement to include the first transaction, the first merchant identifier, and the first amount, thereby creating an updated digital statement. At block 840, process 800 can include receiving, from one of the one or more other user accounts, a request to view the updated digital statement in a GUI.

At block 845, process 800 can include determining that the first transaction falls into a first category to be obscured on the updated digital statement. This determination can be similar to the process steps described above with reference to block 535 of FIG. 5A and with reference to FIG. 6. For example, a first category to be obscured can include any category in which a number of historical transactions is less than a predetermined value, thereby indicating it is an out-of-the norm purchase for the first user account. If the first transaction does not fall into a first category to be obscured, the process can end. If the first transaction does fall into a first category to be obscured, process 800 can proceed to block 850.

At block 850, process 800 can include obscuring at least one of the first merchant identifier (e.g., the information in the description field 304 in FIG. 3A) or the first amount (e.g., the information in the amount field 306 in FIG. 3A) in response to determining that the first transaction falls into the first category to be obscured. Block 850, therefore, can create an obscured version of the digital statement.

At block 855, process 800 can include outputting the GUI to include the updated digital statement for display on a first user device associated with the first user account. At block 860, process 800 can include outputting, in response to determining that the first transaction falls into the first category to be obscured, the GUI to include the obscured version of the digital statement for display on a second user device associated with the one or more other user accounts.

Process 800 can end after block 860. In other examples, additional steps can be performed according to the examples described herein or other examples. For example, process 800 can include receiving historical transaction data and categorizing individual transaction into a plurality of purchase categories. The step (i.e., block 845) of determining that the first transaction falls into the first category to be obscured on the updated digital statement can include comparing the first transaction with the plurality of purchase categories. Additional steps can be completed similar to the steps described above with reference to method 500 in FIGS. 5A and 5B.

Referring again to the system 100 described in FIG. 1, the transaction system 102 can include one or more processors 112, a memory 114, and data storage, for example in database 120. The processor 112 can include one or more of a microprocessor, microcontroller, digital signal processor, co-processor or the like or combinations thereof capable of executing stored instructions and operating upon stored data.

The memory 114 of the transaction system 102 can include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data.

The memory 114 of the transaction system 102 can contain an operating system ("OS") 116 that can run one or more programs 118. The one or more programs 118 can perform one or more functions of the disclosed examples. The one or more programs 118 can include, for example, a program for creating the application 402 operable on the user devices (e.g., first user device 104 and second user device 106) and can generate the GUIs described herein.

The memory 114 can also include any combination of one or more databases, including for example database 120, controlled by memory controller devices (e.g., server(s), etc.) or software, such as document management systems, Microsoft® SQL databases, SharePoint® databases, Oracle® databases, Sybase® databases, or other relational databases.

The transaction system 102 can include a communication interface 122 for communicating with external systems or internal systems. The communication interface 122 can include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof. The communication interface 122 can include a transceiver 124 to communicate with compatible devices. A transceiver 124 can be compatible with one or more of: radio-frequency identification (RFID), near-field communication (NFC), Bluetooth™, low-energy Bluetooth™ (BLE), WiFi™, ZigBee™, ambient backscatter communications (ABC) protocols, or similar technologies that enables the transaction system 102 to communicate via the network 110 described herein.

Referring to the merchant system 108, the merchant system 108 can include one or more processors 126, a memory 128, and data storage, for example in database 134, which can be similar to the one or more processors 112, memory 114, and database 120 described for the transaction system 102, respectively. The memory 128 of the merchant system 108 can contain an operating system ("OS") 130 that can run one or more programs 132, which can be similar to the OS 116 and programs 118 described for the transaction system 102, respectively. The merchant system 108 can include a communication interface 136 for communicating with external systems or internal systems, and the communication interface 136 can include a transceiver 138 to communicate with compatible devices. The communication interface 136 and transceiver 138 can be similar to the communication interface 122 and transceiver 124 described for the transaction system 102, respectively.

The merchant system 108 can include or communicate with a point of sale (PoS) device 140. The PoS device 140 can be a hardware system that can receive and process a payment from the user accounts described herein. This can include a credit/debit card reader, a payment reader having wireless technology for receiving contactless payments, such as near-field communication (NFC) readers.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

The components described in this disclosure as making up various elements of the systems and methods are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Examples of the present disclosure can be implemented according to at least the following clauses:

Clause 1: A method for selectively obscuring transaction information in a graphical user interface (GUI), the method comprising: receiving, at a processor associated with a transaction system, historical transaction data for a first user account; categorizing, via the processor, individual transactions of the historical transaction data into a plurality of purchase categories; receiving, at the processor, a transaction notification indicating that a first transaction has been made using a shared account being linked to and accessible by the first user account and a second user account;

determining, via the processor, that the first transaction was completed by the first user account; comparing, via the processor, the first transaction with the plurality of purchase categories; determining, via the processor, whether the first transaction falls outside of an expected transaction type for the first user account based at least on the comparing the first transaction with the plurality of purchase categories; generating, via the processor and responsive to determining that the first transaction falls outside of the expected transaction type for the first user account, the GUI comprising a digital statement listing information related to one or more transactions comprising the first transaction, the GUI being configured to selectively obscure at least a portion of information related to the first transaction from view by the second user account, the information related to the first transaction being selectively viewable by the second user account; receiving, at the processor, a request from the second user account to view the digital statement; and outputting, via the processor, the GUI with the digital statement comprising the information related to the first transaction for display on a first user device associated with the second user account, wherein the at least a portion of the information related to the first transaction displayed on the first user device is obscured on the digital statement responsive to determining that (i) the first transaction was completed by the first user account and (ii) the first transaction falls outside of the expected transaction type for the first user account.

Clause 2: The method of clause 1, further comprising: receiving, at the processor, a request to enroll the first user account of the shared account in a transaction obscuring program; and receiving, at the processor, a request to enroll the second user account of the shared account in the transaction obscuring program.

Clause 3: The method of clause 2, further comprising receiving, at the processor, a list of dates in which to trigger the determination of whether the first transaction falls outside of the expected transaction type, the list of dates being associated with predetermined holidays or events identified by the first user account.

Clause 4: The method of any of clauses 1-3, wherein determining that the first transaction was completed by the first user account comprises: receiving, at the processor, device location data from a second user device associated with the first user account; and comparing, via the processor, merchant location data associated with the first transaction with the device location data.

Clause 5: The method of any of clauses 1-4, wherein determining that the first transaction was completed by the first user account comprises: receiving a device fingerprint from a second user device associated with the first user account, the transaction notification comprising the device fingerprint; and comparing the device fingerprint to device registration data received with the request to enroll a first user account.

Clause 6: The method of any of clauses 1-5, further comprising: receiving, at the processor, an indication that the second user account wishes to view the information related to the first transaction on the first user device; generating, via the processor, a password field in the GUI configured to receive a password associated with the second user account; receiving, via the GUI and from the first user device, data indicating receipt of the password in the password field; and revealing, responsive to receiving the data indicating receipt of the password, the information related to the first transaction such that the first transaction is viewable by the second user account.

Clause 7: The method of any of clauses 1-6, further comprising outputting for transmission, via the processor, a notification to a first device associated with the first user account indicating that the second user account wishes to view the information related to the first transaction.

Clause 8: A system for increasing security of a digital statement comprising: one or more processors; and memory in communication with the one or more processors and storing instructions that, when executed by the one or more processors, are configured to cause the system to: generate the digital statement comprising a plurality of transactions for a shared account, the shared account being linked to and accessible by a first user account and a second user account; receive, from a merchant system, a first indication that the first user account completed a first transaction; update the digital statement to comprise the first transaction; and generate, responsive to updating the digital statement, a first graphical user interface (GUI) comprising the digital statement listing information related to the plurality of transactions comprising the first transaction, the first GUI displaying all information related to the first transaction; and generate, responsive to updating the digital statement, a second GUI comprising the digital statement listing information related to the plurality of transactions comprising the first transaction, the second GUI being configured to selectively obscure at least a portion of the information related to the first transaction from view by the second user account, the information related to the first transaction being selectively viewable by the second user account.

Clause 9: The system of clause 8, wherein the instructions, when executed by the one or more processors, are further configured to cause the system to: receive a second indication that the second user account wishes to view the information related to the first transaction; and reveal, responsive to receiving the second indication, the information related to the first transaction in the second GUI such that the information is viewable by the second user account.

Clause 10: The system of clause 9, wherein the instructions, when executed by the one or more processors, are further configured to cause the system to transmit a notification to a user device associated with the first user account indicating that the second user account wishes to view the information related to the first transaction.

Clause 11: The system of any of clauses 8-10, wherein obscuring the information related to the first transaction from the second user account comprises generating spoiler text on the second GUI at a location of the first transaction on the digital statement, the spoiler text being removable by the second user account.

Clause 12: The system of any of clauses 8-11, wherein the instructions, when executed by the one or more processors, are further configured to cause the system to: receive a second indication that the second user account wishes to view the information related to the first transaction; generate a password field in the second GUI configured to receive a password associated with the second user account; receive, via the second GUI and from a user device associated with the second user account, data indicating receipt of the password in the password field; and reveal, responsive to receiving the data indicating receipt of the password, the information related to the first transaction in the GUI such that the first transaction is viewable by the second user account.

Clause 13: The system of any of clauses 8-12, wherein the instructions, when executed by the one or more processors, are further configured to cause the system to: compare the first transaction to historical transaction data for the first user account; and determine, based on comparing the historical transaction data, that the first transaction falls outside of an expected transaction type by the first user account, the determination being based at least on purchase categories associated with the historical transaction data, wherein the second GUI obscures the information related to the first transaction from the second user account responsive to determining that the first transaction falls outside of the expected transaction type.

Clause 14: The system of clause 13, wherein the instructions, when executed by the one or more processors, are further configured to cause the system to generate a display, for output to the first GUI and the second GUI, comprising enrollment fields seeking input from the first user account and the second user account to opt-in to a transaction obscuring program.

Clause 15: The system of clause 14, wherein the instructions, when executed by the one or more processors, are further configured to cause the system to: receive, from a user device and responsive to seeking input from the first user account to opt-in to the transaction obscuring program, a list of dates in which to trigger the determination that the first transaction falls outside of the expected transaction type, the list of dates being associated with predetermined holidays or events identified by the first user account; and compare a first transaction category of the first transaction to the holidays or events.

Clause 16: The system of any of clauses 8-15, wherein the instructions, when executed by the one or more processors, are further configured to cause the system to: receive device location data from a first user device associated with the first user account, the first indication comprising the device location data; and compare the device location data to merchant location data; and determine that the first transaction was completed by the first user account responsive to comparing the device location data to the merchant location data.

Clause 17: The system of any of clauses 8-16, wherein the instructions, when executed by the one or more processors, are further configured to cause the system to: receive a device fingerprint from a first user device associated with the first user account, the first indication comprising the device fingerprint; and compare the device fingerprint to device registration data; and determine that the first transaction was completed by the first user account responsive to comparing the device fingerprint to the device registration data.

Clause 18: A system for obscuring gift purchases in a digital statement, the system comprising: one or more processors; and memory in communication with the one or more processors and storing instructions that, when executed by the one or more processors, are configured to cause the system to: store financial information related to a financial account shared by a first user account and one or more other user accounts; receive data indicative of a plurality of financial transactions for the first user account and the one or more other user accounts; generate a digital financial statement comprising the plurality of financial transactions, the statement comprising a plurality of line items, each line item being associated with one transaction of the plurality of financial transactions and comprising a merchant identifier and a transaction amount; receive an indication of a first transaction from a merchant device, the indication of the first transaction comprising a first merchant identifier and a first amount; determine that the first transaction was completed by the first user account; update the digital financial statement to comprise the first transaction, the first merchant identifier, and the first amount, thereby creating an updated digital statement; receive, from one of the one or more other user accounts, a request to view the updated digital statement in a graphical user interface (GUI); determine that the first transaction falls into a first category to be obscured on the updated digital statement; obscure at least one of the first merchant identifier or the first amount in response to determining that the first transaction falls into the first category to be obscured, thereby creating an obscured version of the digital statement; output the GUI to include the updated digital statement for display on a first user device associated with the first user account; and output, in response to determining that the first transaction falls into the first category to be obscured, the GUI to include the obscured version of the digital statement for display on a second user device associated with the one or more other user accounts.

Clause 19: The system of clause 18, wherein the instructions are further configured to cause the system to: receive historical transaction data for the first user account; and categorize individual transactions of the historical transaction data into a plurality of purchase categories, wherein the step of determining that the first transaction falls into the first category to be obscured on the updated digital statement comprises comparing the first transaction with the plurality of purchase categories.

Clause 20: The system of clause 19, wherein the instructions are further configured to cause the system to receive a list of dates in which to trigger the determination that the first transaction falls into a first category to be obscured on the updated digital statement, the list of dates being associated with predetermined holidays or events identified by the first user account.

Exemplary Use Cases

The following exemplary use cases describe examples of a typical user flow pattern. They are intended solely for explanatory purposes and not limitation.

Jim and Ann share a single checking account at National Bank. This allows them to have multiple debit cards that draw from the same account. One day, Ann decides she wants to purchase a new gaming laptop for Jim at Best Buy® as a present, since he has been interested in purchasing it for some time. She goes to the local Best Buy® store, grabs the laptop, and pays for the laptop at the store's point of sale device using her debit card. Once the purchase is made, the date of the purchase, name of the store, and transaction amount posts on Ann and Jim's National Bank digital statement for their shared checking account. So that Jim is unaware of her purchase (since he knows the laptop costs around $1200), Ann logs into her banking account with National Bank and chooses to hide the details related to the purchase. Later that week, Jim is looking at his bank statement and notices a purchase with spoiler text hiding some (e.g., the merchant) or all of the details about the $1200 purchase. He knows that this could be a gift, so he does not click on the spoiler text or attempt to reveal the information related to that purchase.

In the same initial fact pattern as above, after purchasing the laptop, Ann forgets to log into her account to hide the gift. However, Ann and Jim are both enrolled in a transaction obscuring program at National Bank, and the backend system at National Bank can assess whether the purchase is not an expected purchase for Ann. The backend system identifies that Ann has only made two purchases in the past six months at a business with a merchant category code linked to "electronic sales" (MCC 5732) or "computer sales" (MCC 5045). National Bank has a threshold of three purchases within a purchase category within the preceding six months to trigger transaction obscuration, so the system flags the purchase as outside normal purchases and automatically hides the information related to the purchase on the digital statement.

A week later, Jim reviews his digital statement for the shared account, notices a hidden purchase for over $1,200 and is curious that it might be in error. He clicks on the spoiler text, which populates a password field for him to enter his password. After entering his password and clicking "reveal," the transaction information is then fully revealed in Jim's user interface, thereby potentially ruining his surprise gift. Ann then receives a push notification from National Bank stating Jim reviewed the hidden transaction.

In yet another variation of the facts above, in determining whether Ann made the purchase (so that the laptop purchase was hidden on Jim's digital statement and not Ann's), National Bank reviewed location data on Ann's smart phone. National Bank received the transaction request at 3:23 PM on Sep. 29, 2020. Using the banking application stored on Ann's smart phone and the location services data stored as well, National Bank's backend system identifies that Ann was within ¼ mile of a Best Buy® at 3:15 PM on Sep. 29, 2020. Using this information, the bank was able to discern that Ann made the purchase, and therefore automatically concealed the laptop purchase only in Jim's digital statement.

Rewinding to when Jim and Ann enrolled in a shared checking account, National Bank provided a screen in their banking application asking whether they would like to enroll in a transaction obscuring program. After both accepted, National Bank asked both users to provide trigger dates, such as birthdays, holidays, and/or anniversaries, in which to trigger gift obscuration. Ann inputted Jim's birthday, which is October 12. When making the laptop purchase on September 29, National Bank automatically concealed the transaction information in Jim's digital statement because (1) it was performed by Ann (or another authorized user besides Jim), (2) it was outside of Ann's expected purchases, and (3) it was within one month of a trigger date. Jim did not click on the transaction information to reveal the information between September 29 and October 12, and the full transaction information was automatically, and permanently, revealed to both Ann and Jim on October 13.

The systems described herein can also provide for customized statement views for each account holder of a shared account. In another fact pattern, User A, User B, and User C are all authorized users for a shared corporate account for Company X. User A is in charge of handling utility payments for Company X using her credit card linked to the shared corporate account. User B is in charge of purchasing supplies for Company X using his credit card linked to the shared corporate account. User C is in charge of covering travel costs for employees of Company X using his credit card linked to the shared corporate account. Using the systems and methods described above, each digital statement accessed by User A, User B, and User C can be customized based on their purchasing roles. For example, the system can hide User B's supply purchases from User A and User C, and the system can hide User C's travel transactions from User A and User B. This means that, when User A reviews her digital statement, only the utility charges are presently viewable, and the costs for supplies and travel are obscured according to the present disclosure. This can provide a more streamlined experience when the users all review their respective digital statements.

What is claimed is:

1. A method for selectively obscuring transaction information in a graphical user interface (GUI), the method comprising:
    receiving, at a processor associated with a transaction system, historical transaction data for a first user account;
    categorizing, via the processor, individual transactions of the historical transaction data into a plurality of purchase categories;
    receiving, at the processor, a transaction notification indicating that a first transaction has been made using a shared account being linked to and accessible by the first user account and a second user account, the first transaction notification including a time stamp associated with the first transaction;
    determining, via the processor, that the first transaction was completed by the first user account by:
        comparing, via the processor, the first transaction with the plurality of purchase categories;
        receiving, at the processor, device location data, corresponding to a time of the time stamp, from a first user device associated with the first user account;
        comparing, via the processor, merchant location data associated with the first transaction with the device location data;
        receiving a device fingerprint or a device hardware identifier from the first user device;
        comparing the device fingerprint or the device hardware identifier to device registration data for the first user account; and
        determining, via the processor, whether the first transaction falls outside of an expected transaction type for the first user account based at least on the comparing the first transaction with the plurality of purchase categories;
    generating, via the processor and responsive to determining that the first transaction falls outside of the expected transaction type for the first user account, the GUI comprising a digital statement listing information related to one or more transactions comprising the first transaction, the GUI being configured to selectively obscure at least a portion of information related to the first transaction from view by the second user account, the information related to the first transaction being selectively viewable by the second user account;
    receiving, at the processor, a request from the second user account to view the digital statement;
    outputting, via the processor, the GUI with the digital statement comprising the information related to the first transaction for display on a second user device associated with the second user account, wherein the at least a portion of the information related to the first transaction displayed on the first user device is obscured on the digital statement responsive to determining that (i) the first transaction was completed by the first user account, (ii) the first transaction falls outside of the expected transaction type for the first user account, and (iii) the merchant location data corresponds to the device location data;

receiving, at the processor, an indication that the second user account wishes to view the portion of the information related to the first transaction that is obscured;

generating, via the processor, a password field in the GUI configured to receive a password associated with the second user account;

receiving, via the GUI and from the second user device, data indicating receipt of the password in the password field; and revealing, responsive to receiving the data indicating receipt of the password, the information related to the first transaction such that the portion of the first transaction that was previously obscured is viewable by the second user account.

2. The method of claim 1, further comprising:

receiving, at the processor, a request to enroll the first user account of the shared account in a transaction obscuring program; and receiving, at the processor, a request to enroll the second user account of the shared account in the transaction obscuring program.

3. The method of claim 2, further comprising receiving, at the processor, a list of dates in which to trigger the determination of whether the first transaction falls outside of the expected transaction type, the list of dates being associated with predetermined holidays or events identified by the first user account.

4. The method of claim 1, further comprising outputting for transmission, via the processor, a notification to a first device associated with the first user account indicating that the second user account wishes to view the information related to the first transaction.

5. A system for increasing security of a digital statement comprising:

one or more processors; and memory in communication with the one or more processors and storing instructions that, when executed by the one or more processors, are configured to cause the system to:

generate the digital statement comprising a plurality of transactions for a shared account, the shared account being linked to and accessible by a first user account and a second user account;

receive, from a merchant system, a first of a first transaction;

receive a device fingerprint or a device hardware identifier from a first user device associated with the first user account, the first indication comprising the device fingerprint or the device hardware identifier;

compare the device fingerprint or the device hardware identifier to device registration data;

compare the first transaction to historical transaction data for the first user account;

determine that the first transaction was completed by the first user account responsive to comparing the device registration data to the device fingerprint or the device hardware identifier;

determine that the first transaction falls outside of an expected transaction type by the first user account by comparing to the historical transaction data, the determination being based at least on purchase categories associated with the historical transaction data;

update the digital statement to comprise the first transaction;

generate, responsive to updating the digital statement, a first graphical user interface (GUI) comprising the digital statement listing information related to the plurality of transactions comprising the first transaction, the first GUI displaying all information related to the first transaction;

generate, responsive to updating the digital statement, a second GUI comprising the digital statement listing information related to the plurality of transactions comprising the first transaction, the second GUI being configured to selectively obscure at least a portion of the information related to the first transaction from view by the second user account, the information related to the first transaction being selectively viewable by the second user account, the at least a portion of the information related to the first transaction being selectively obscured responsive to (i) determining that the first transaction was completed by the first user account and (ii) determining that the first transaction falls outside of the expected transaction type;

outputting the second GUI for display on a user device, the at least a portion of the information related to the first transaction being obscured;

receive a second indication that the second user account wishes to view the at least a portion of the information related to the first transaction that is obscured;

generate a password field in the second GUI configured to receive a password associated with the second user account;

receive, via the second GUI and from the user device, data indicating receipt of the password in the password field; and reveal, responsive to receiving the data indicating receipt of the password, the at least a portion of the information related to the first transaction that was previously obscured.

6. The system of claim 5, wherein the instructions, when executed by the one or more processors, are further configured to cause the system to transmit a notification to a user device associated with the first user account indicating that the second user account wishes to view the information related to the first transaction.

7. The system of claim 5, wherein obscuring the information related to the first transaction from the second user account comprises generating spoiler text on the second GUI at a location of the first transaction on the digital statement, the spoiler text being removable by the second user account.

8. The system of claim 5, wherein the instructions, when executed by the one or more processors, are further configured to cause the system to generate a display, for output to the first GUI and the second GUI, comprising enrollment fields seeking input from the first user account and the second user account to opt-in to a transaction obscuring program.

9. The system of claim 8, wherein the instructions, when executed by the one or more processors, are further configured to cause the system to:

receive, from a user device and responsive to seeking input from the first user account to opt-in to the transaction obscuring program, a list of dates in which to trigger the determination that the first transaction falls outside of the expected transaction type, the list of dates being associated with predetermined holidays or events identified by the first user account; and compare a first transaction category of the first transaction to the holidays or events.

10. A system for obscuring gift purchases in a digital statement, the system comprising:
one or more processors; and
memory in communication with the one or more processors and storing instructions that, when executed by the one or more processors, are configured to cause the system to:
store financial information related to a financial account shared by a first user account and one or more other user accounts;
receive data indicative of a plurality of financial transactions for the first user account and the one or more other user accounts;
generate a digital financial statement comprising the plurality of financial transactions, the statement comprising a plurality of line items, each line item being associated with one transaction of the plurality of financial transactions and comprising a merchant identifier and a transaction amount;
receive a first indication of a first transaction from a merchant device, the first indication of the first transaction comprising a first merchant identifier, a first amount, and including a time stamp associated with the first transaction at the merchant device;
receive device location data, corresponding to a time of the time stamp, from a first user device associated with the first user account;
compare merchant location data associated with the merchant identifier with the device location data;
receive a device fingerprint or a device hardware identifier from the first user device;
compare the device fingerprint or the device hardware identifier to device registration data for the first user account;
determine that the first transaction was completed by the first user account based at least on (i) the comparison of the merchant location data and the device location data, and (ii) the comparison of the device fingerprint or the device hardware identifier;
update the digital financial statement to comprise the first transaction, the first merchant identifier, and the first amount, thereby creating an updated digital statement;
receive, from one of the one or more other user accounts, a request to view the updated digital statement in a graphical user interface (GUI);
determine that the first transaction falls into a first category to be obscured on the updated digital statement;
obscure at least one of the first merchant identifier or the first amount in response to (i) determining that the first transaction falls into the first category to be obscured and (ii) determining that the first transaction was completed by the first user account, thereby creating an obscured version of the digital statement;
output the GUI to include the updated digital statement for display on the first user device associated with the first user account;
output, in response to determining that the first transaction falls into the first category to be obscured, the GUI to include the obscured version of the digital statement for display on a second user device associated with the one or more other user accounts;
receive a second indication that a second user account of the one or more other user accounts wishes to view at least one of the first merchant identifier or the first amount obscured in the GUI;
generate a password field in the GUI configured to receive a password associated with the second user account;
receive, via the GUI and from the second user device, data indicating receipt of the password in the password field; and
reveal, responsive to receiving the data indicating receipt of the password, the at least one of the first merchant identifier or the first amount in the GUI.

11. The system of claim 10, wherein the instructions are further configured to cause the system to:
receive historical transaction data for the first user account; and
categorize individual transactions of the historical transaction data into a plurality of purchase categories,
wherein the step of determining that the first transaction falls into the first category to be obscured on the updated digital statement comprises comparing the first transaction with the plurality of purchase categories.

12. The system of claim 11, wherein the instructions are further configured to cause the system to receive a list of dates in which to trigger the determination that the first transaction falls into a first category to be obscured on the updated digital statement, the list of dates being associated with predetermined holidays or events identified by the first user account.

* * * * *